United States Patent [19]
Blyler, Jr. et al.

[11] Patent Number: 5,166,993
[45] Date of Patent: Nov. 24, 1992

[54] MOLDED POLYMERIC RESIN-FILLED OPTICAL COUPLER

[75] Inventors: Lee L. Blyler, Jr., Basking Ridge, N.J.; Gary J. Grimes, Thornton; Lawrence J. Haas, Broomfield, both of Colo.; Robert M. Lien, Chester, N.J.; Emiel Ysebaert, Louisville, Colo.

[73] Assignee: AT&T Bell Laboratories, Murray Hill, N.J.

[21] Appl. No.: 624,154

[22] Filed: Dec. 7, 1990

[51] Int. Cl.⁵ .................................... G02B 6/26
[52] U.S. Cl. ........................... 385/31; 385/65; 385/71; 385/22
[58] Field of Search ............... 350/96.15, 96.16, 96.20, 350/96.21, 65, 71, 22, 31

[56] References Cited

U.S. PATENT DOCUMENTS

| | | | |
|---|---|---|---|
| 3,756,688 | 9/1973 | Hudson et al. | 350/96 WG |
| 3,874,781 | 4/1975 | Thiel | 350/96 C |
| 4,169,656 | 10/1979 | Hodge | 350/96.15 |
| 4,198,118 | 4/1980 | Porter | 350/96.16 |
| 4,212,512 | 7/1980 | Hodge | 350/96.15 |
| 4,484,794 | 11/1984 | Witte | 350/96.16 |
| 4,913,508 | 4/1990 | Blyler, Jr. et al. | 350/96.16 |
| 4,923,275 | 5/1990 | Kaukeinen | 350/96.2 X |
| 4,927,229 | 5/1990 | Tanaka et al. | 350/96.21 |
| 4,995,686 | 2/1991 | Blonder et al. | 350/96.15 |

OTHER PUBLICATIONS

Crow et al., IBM Technical Disclosure Bulletin,, vol. 23, No. 4, p. 1686, Sep. 1980.

Primary Examiner—John D. Lee
Assistant Examiner—Stephen W. Barns
Attorney, Agent, or Firm—John C. Moran

[57] ABSTRACT

A molded polymeric resin-filled coupler comprising two low-refractive index plastic molded subassemblies. One subassembly has an optically finished mixing region, with a channel that has a V shaped lower portion. The mixing region subassembly is covered with a lid subassembly of the same material as the mixing region subassembly. During assembly, optical fibers are inserted into the mixing region subassembly which is then filled with a high index material to form a high-refractive index waveguide core region in the channel. The molded low-refractive index subassemblies provide a waveguide cladding around the high-refractive index waveguide core. Low cost is attained by utilizing optically finished metal molds to produce the subassemblies resulting in an optically finished mixing region and lid subassemblies without the need to polish each subassembly.

12 Claims, 6 Drawing Sheets

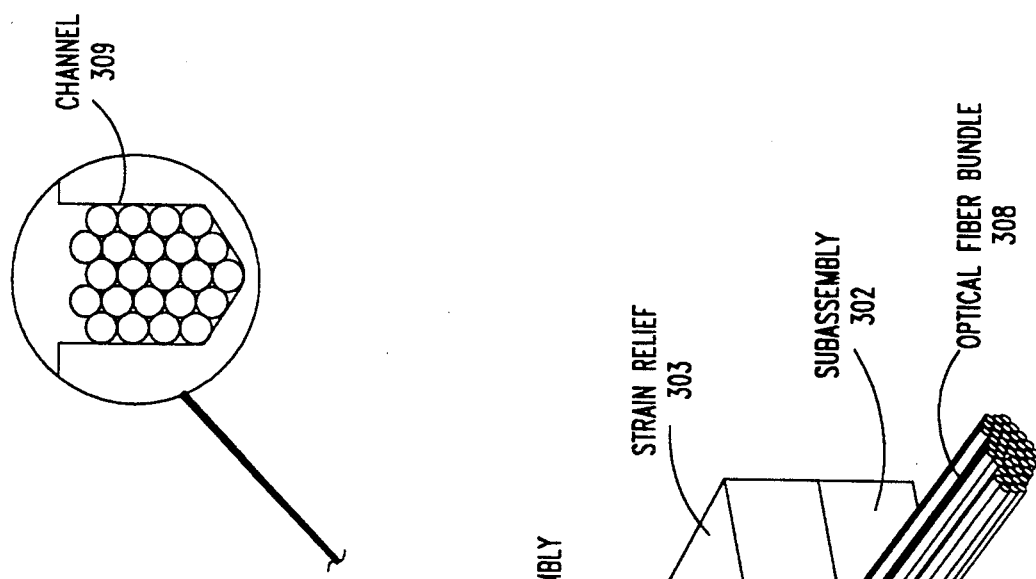
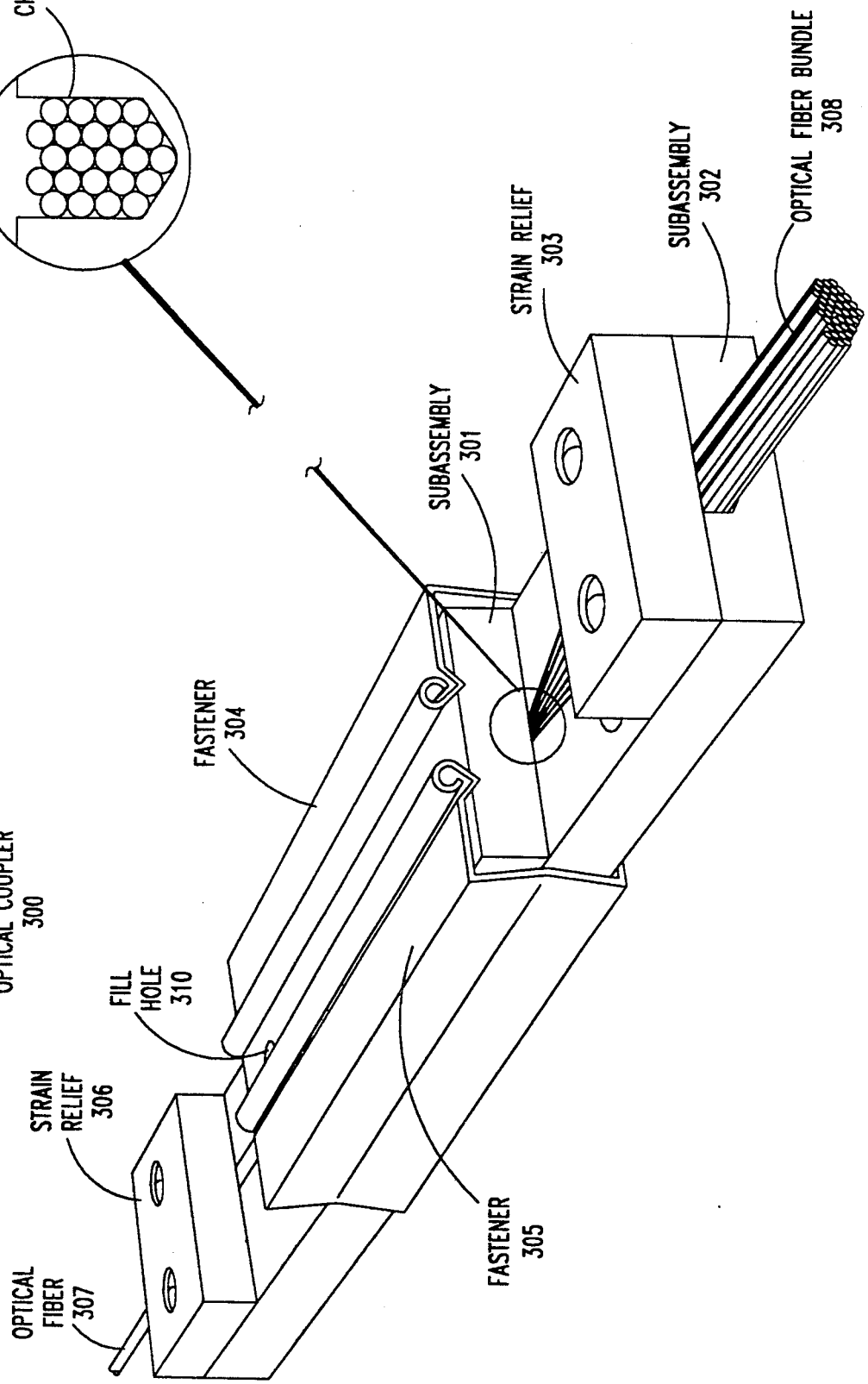

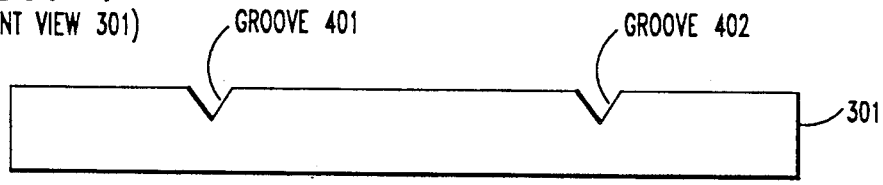
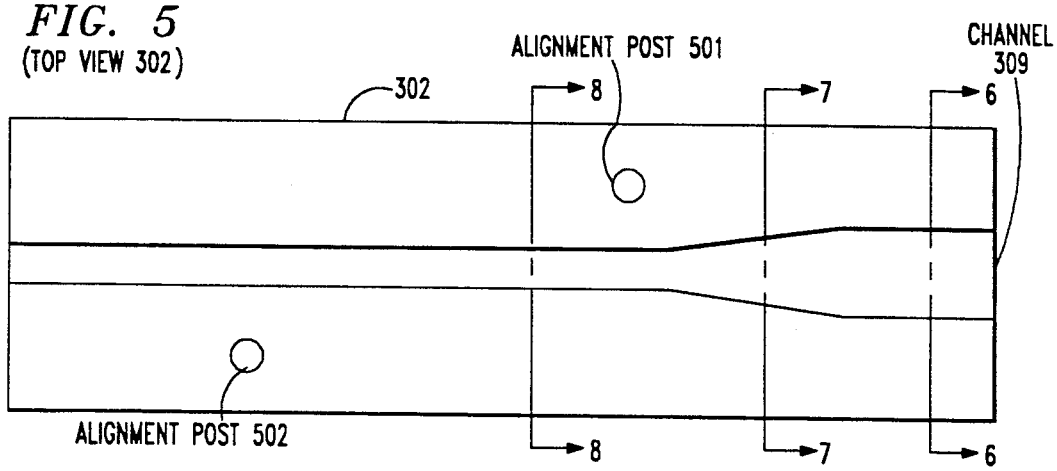
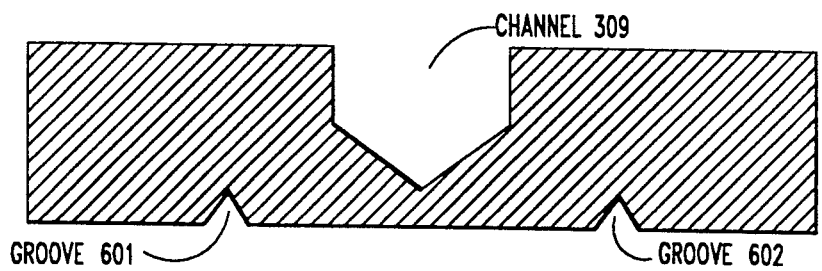
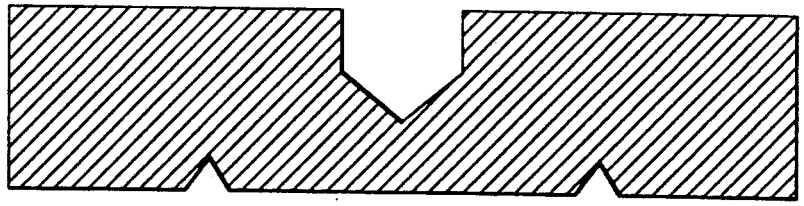
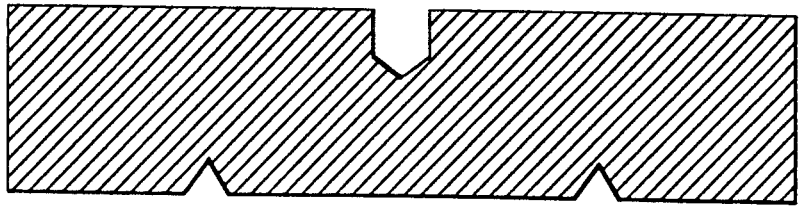

(MOLD FOR SUBASSEMBLY 301)

MOLDED POLYMERIC RESIN-FILLED OPTICAL COUPLER

TECHNICAL FIELD

The present invention relates to the transmission of light in an optical system and, in particular, to an optical coupler used in such a system.

BACKGROUND OF THE INVENTION

In many optical local area networks (LAN) and backplanes that have a bus-type architecture, an optical repeater receives and combines optical signals from optical transmitters in system nodes, as well as amplifies and individually retransmits signals to optical receivers in the system nodes. In this prior art system, optical couplers are referred to as optical splitters and combiners which designate the functions being performed by these optical couplers.

FIG. 2 illustrates a prior art optical coupler in accordance with U.S. Pat. No. 4,913,508 that can perform the functions of the combiner and splitter of FIG. 1. Optical signals from optical fiber bundle 201 are coupled via optical coupler 203 to optical fiber 204. Similarly, an optical signal from optical fiber 204 is coupled to optical fiber 201 bundle. The cavity of optical coupler 203 forms the optical waveguide core of the optical coupler and is substantially circular. The cavity is filled with a material having a refractive index such that the resulting optical waveguide has a numerical aperture that substantially matches the numerical apertures of optical fiber 204 and optical fiber bundle 201.

One problem with the coupler of FIG. 2 is that there is no selfaligning mechanism to guarantee that the fibers of the optical fiber bundle will always have a particular arrangement within the optical coupler. This arrangement is necessary to assure that the optical communications characteristics of different optical fiber and coupler combinations are uniform. Such an alignment is also particularly important for field applications where the field personnel do not have access to sophisticated laboratory equipment that can verify the communication quality of the fiber and coupler combination. In addition, field personnel do not have the time to be sure that fibers are arranged in a particular way. Another problem with the coupler of FIG. 2 is that it does not have a low cost.

SUMMARY OF THE INVENTION

The aforementioned problems are solved and a technical advance is achieved in the art by an optical coupler that has a channel whose lower portion is V-shaped so that optical fibers of an optical fiber bundle assume a particular arrangement in the channel. This channel also aligns the optical fiber bundle with a single optical fiber for the communication of light within the optical coupler. The coupler comprises two low-refractive index resin molded subassemblies. One subassembly has an optically finished mixing region, with a channel that has a V-shaped lower portion. The mixing region subassembly is covered with a lid subassembly of the same material. After insertion of optical fibers, the mixing region subassembly is filled with a high index material to form a high-refractive index waveguide core region in the channel.

Advantageously, the molded low-refractive index structural subassemblies provide the waveguide cladding around the high-refractive index waveguide core.

The core is of an optical medium that is inserted into the mixing region in semi-liquid form after the optical fibers are attached. The optical medium also provides the adhesive to hold the fibers in place. To reduce optical loss, the core substantially matches the numerical apertures of the optical fiber bundle and optical fiber.

The low cost objective is attained by utilizing optically finished metal molds to produce the subassemblies. These molds produce optically finished mixing region and lid subassemblies without the need for polishing each subassembly. A strain relief further secures the optical fibers to the optical coupler. The strain relief holding the bundle of optical fibers allows the alignment of the ends of the fibers against a removable stop.

Other and further aspects of the present invention will become apparent during the course of the following description and by reference to the accompanying drawing.

BRIEF DESCRIPTION OF THE DRAWING

Referring now to the drawing:

FIG. 3 illustrates an optical coupler in accordance with the invention;

FIG. 4 illustrates a front view of subassembly 301 of FIG. 3;

FIG. 5 illustrates a top view of subassembly 302 of FIG. 3;

FIGS. 6, 7, and 8 illustrate various cross-sectional views of subassembly 302;

FIG. 12 illustrates a cross-section of subassembly 302 of FIG. 1.

DETAILED DESCRIPTION

Figure 1:
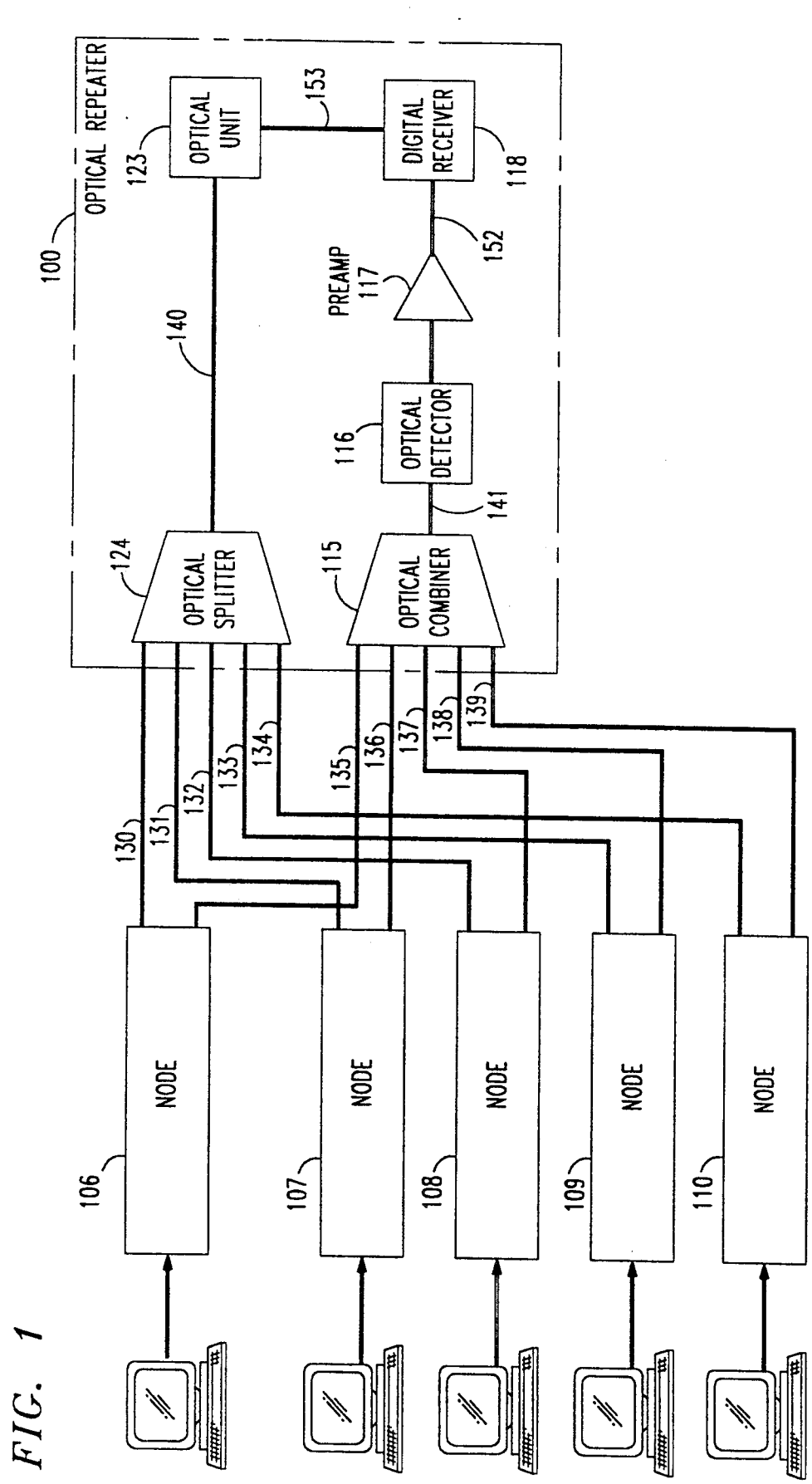
FIG. 1 illustrates a prior art optical transmission system.
Figure 2:
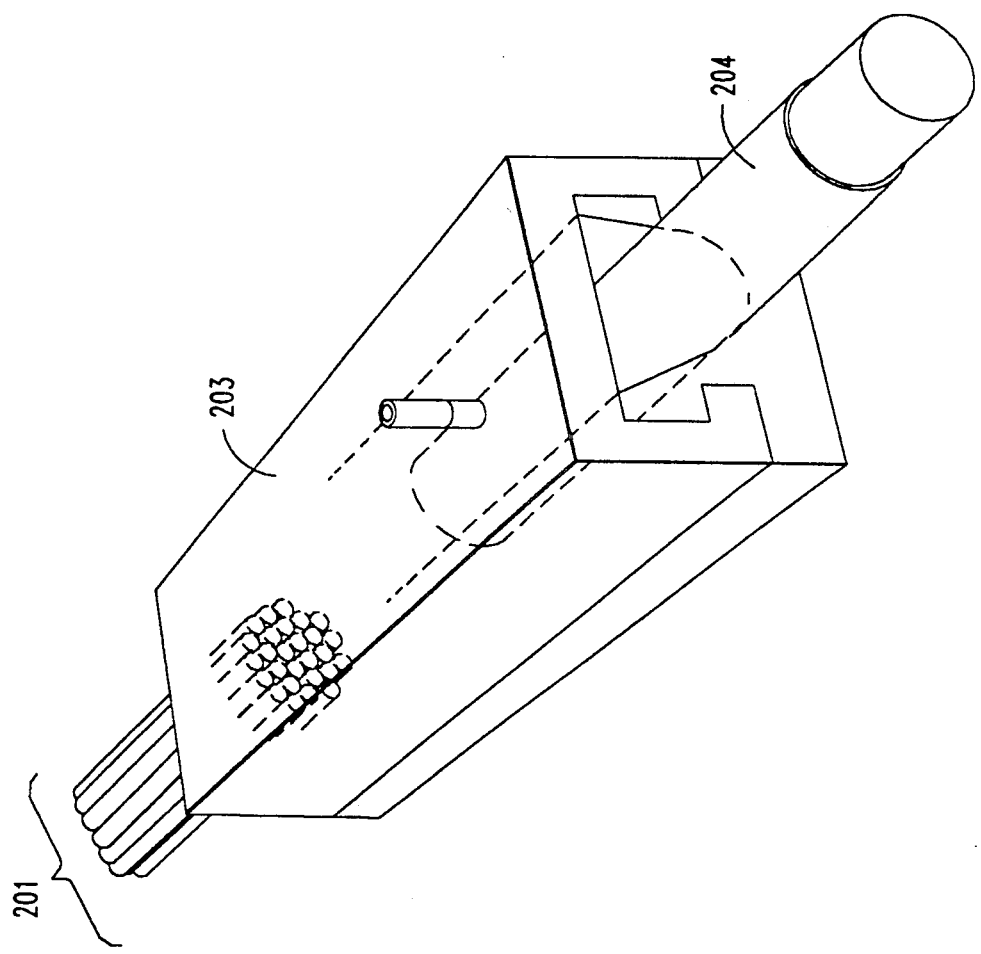
FIG. 2 illustrates a prior art optical coupler.

In the optical transmission system illustrated in FIG. 1, nodes 106 through 110 transmit and receive optical signals to and from optical repeater 100 and optical fibers 130 through 139. Specifically, optical repeater 100 receives and combines optical signals via optical fibers 135 through 139 and redistributes these optical signals via optical fibers 130 through 134. Optical combiner 115 receives and combines the optical signals; whereupon components 116, 117, and 118 electrically process the combined signal. Optical unit 123 then converts the combined electrical signals to an optical signal and transfers it to optical splitter 124 via optical link 140 which communicates the optical signal on links 130 through 134. Optical combiners and splitters, such as units 115 and 124, are generically referred to herein as optical couplers.

FIG. 3 illustrates optical coupler 300 constructed in accordance with the invention. Optical coupler 300 may be used in an optical transmission system such as illustrated in FIG. 1. Advantageously, optical coupler 300 communicates light between optical fiber bundle 308 and optical fiber 307. Optical coupler 300 includes subassemblies 301 and 302 attached to one another by fasteners 304 and 305. Strain relief 303 secures optical fiber bundle 308 to subassembly 302, and strain relief 306 secures optical fiber 307 to subassembly 302. The flat face of subassembly 301 that interfaces to subassembly 302 has an optically smooth finish achieved by molding the face against an optically finished metal mold. Further details of subassembly 301 are illustrated in FIG. 4 which illustrates grooves 401 and 402 by which fasteners 304 and 305 are secured to subassembly 301.

In accordance with the invention, subassembly 302 is molded in an optically finished metal mold so that the lower portion of channel 309 has a V-shape. This V-shaped portion of channel 309 properly and consistently arranges the fibers of optical fiber bundle 308. As illustrated in FIG. 3 for a 23 optical fiber bundle, channel 309 performs the arranging of the optical fibers by the V-portion of the channel being dimensioned such that 5 optical fibers fit within the V-portion. As illustrated, these 5 optical fibers determine the positions of the remaining optical fibers because channel 309 is capped by subassembly 301. Only the arrangement of optical fibers is assured by channel 309, not that a particular optical fiber will occupy a particular position. It would be obvious to one skilled in the art that the dimensions of channel 309 could accommodate different sizes and numbers of optical fibers. In addition, the shape of channel 309 assures that the optical fibers of optical fiber bundle 308 have the greatest physical packing density in order to achieve the greatest uniform illumination efficiency with respect to optical fiber 307. Channel 309 also properly positions optical fiber 307 with respect to optical fiber bundle 308 because the V-portion forces optical fiber 307 to be in a specific position within channel 309. This positioning works because optical fiber 307 has a larger diameter than any of the individual optical fibers of optical fiber bundle 308.

As noted above, fasteners 304 and 305 secure subassemblies 301 and 302 together. These fasteners fit into grooves 401 and 402 of subassembly 301 as illustrated in FIG. 4 and into grooves 601 and 602 of subassembly 302 as illustrated in FIG. 6. Once in place, fasteners 304 and 305 securely grip and hold subassemblies 301 and 302 together.

A top view of subassembly 302 is illustrated in FIG. 5. The initial portion of channel 309 is large enough to accommodate the optical fibers of optical fiber bundle 308 with each optical fiber of optical fiber bundle 308 still having its buffer covering. FIG. 6 illustrates cross section A that illustrates the portion of subassembly 302 which accommodates the optical fibers with their buffer covering. FIG. 7 illustrates cross section B of FIG. 5 where the buffer covering has been removed from the optical fibers of bundle 308 and the optical fibers are to be aligned into the final cross section of channel 309 (which is cross section C illustrated in FIG. 8).

Optical coupler 300 is assembled as follows. First, subassemblies 301 and 302 are fitted together utilizing alignment posts (posts 501 and 502 as illustrated in FIG. 5) in subassembly 302 which fit into corresponding alignment holes in subassembly 301. Subassemblies 301 and 302 are secured by fasteners 304 and 305 positioned as illustrated in FIG. 3.

Figure 9:
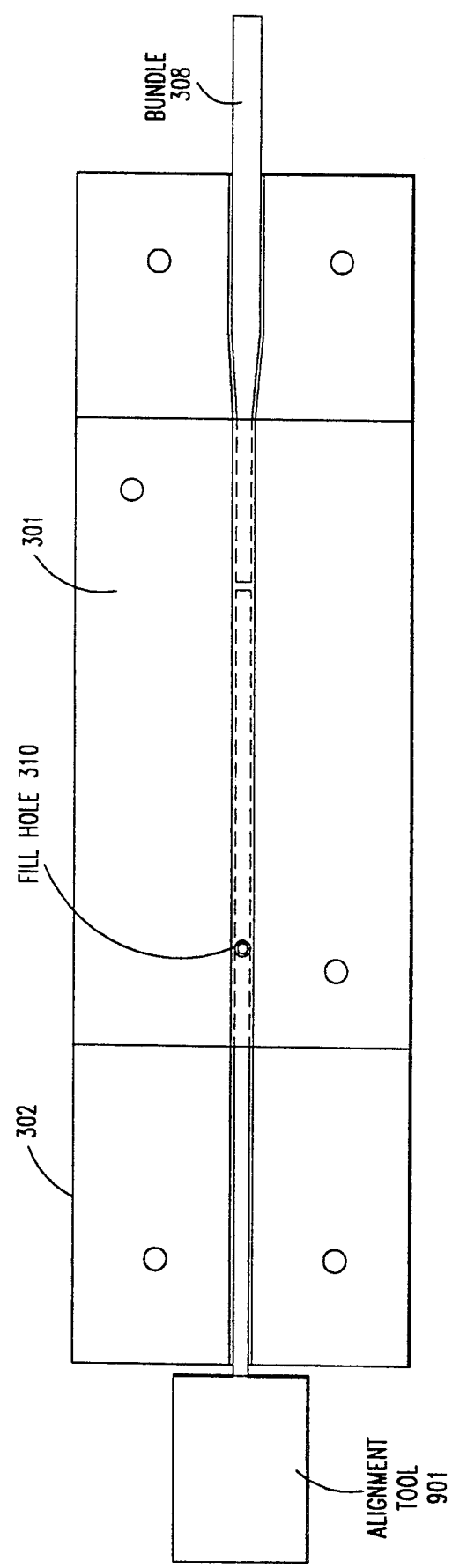
FIG. 9 illustrates a portion of the fabrication process of the optical coupler of FIG. 3.

The buffer covering of the optical fibers of optical fiber bundle 308 is removed so that the bundle can be inserted into channel 309 to the depth illustrated in FIG. 9. After removal of the buffer covering, optical fiber bundle 308 is inserted into channel 309 until all fibers of that bundle come to rest against the end of alignment tool 901 as illustrated in FIG. 9. The portion of alignment tool 901 that is inserted into channel 309 has substantially the same shape as channel 309 at its smallest cross section. Strain relief 303 is then attached to subassembly 302 with two bolts and two nuts.

At this point, alignment tool 901 is removed from channel 309. The buffer covering of optical fiber 307 is removed so that the fiber can be inserted into channel 309. Optical fiber 307 is inserted into channel 309 from the opposite end of optical fiber bundle 308 until optical fiber 307 is just short of the left hand portion of fill hole 310 as illustrated in FIG. 9.

A transparent optical medium, a semi-liquid material that later hardens to a solid, is then injected through fill hole 310. The optical medium has a refractive index selected to be higher than the refractive index of subassemblies 301 and 302 so as to form an optical waveguide with a numerical aperture which substantially matches the numerical apertures of fiber 307 and the fibers of optical fiber bundle 308.

After injection of the optical medium, optical fiber 307 is repositioned to the right of fill hole 310 so that optical fiber 307 is embedded into the optical medium. At this point, strain relief 306 is attached to subassembly 302 to secure optical fiber 307. Details on the preparation, insertion, and type of optical medium are given in U.S. Pat. No. 4,913,508, which is hereby incorporated by reference. The optical medium not only provides matching for the numerical apertures but also helps secure both optical fiber 307 and optical fiber bundle 308 to optical coupler 300.

Figure 10:
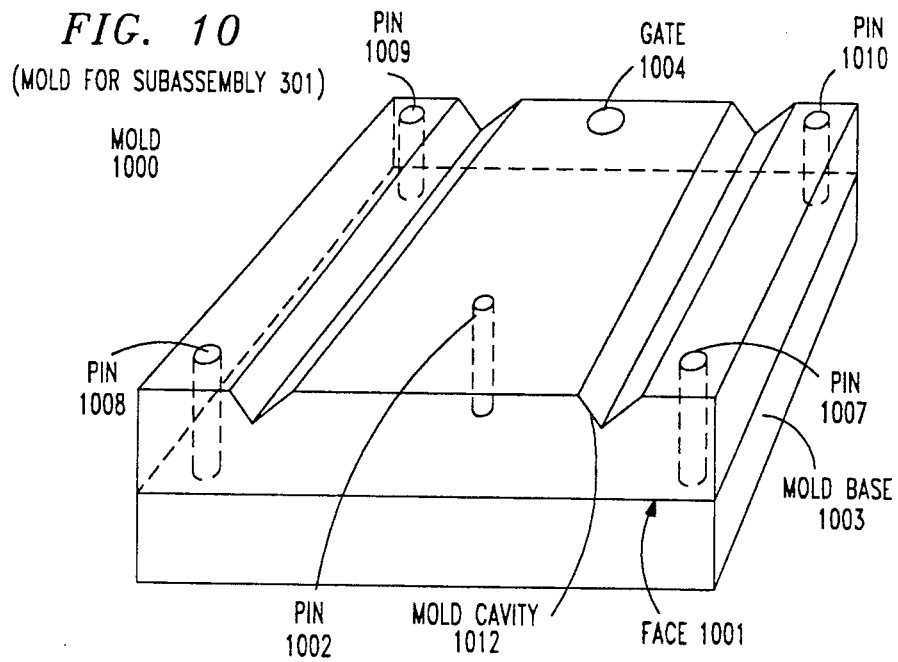
FIGS. 10 and 11 illustrate the molds for fabricating subassemblies 301 and 302, respectively.
Figure 11:
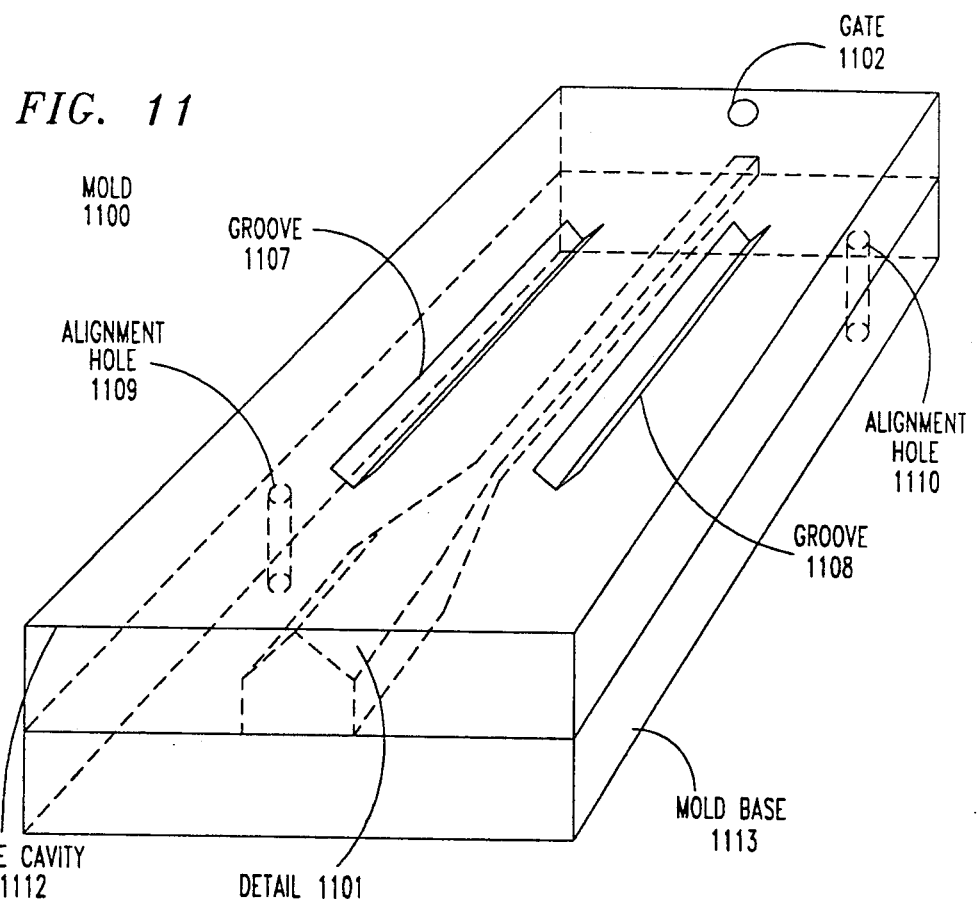

FIGS. 10 and 11 illustrate the molds for fabricating subassemblies 301 and 302, respectively. Mold 1000 for fabricating subassembly 301 comprises mold cavity 1012 and mold base 1003. No thickness is illustrated for the wall of mold cavity 1012 but one skilled in the art could readily determine the thickness of that wall. In order to achieve an optical finish on the surface of subassembly 301 that forms a portion of the optical mixing region of coupler 300, an optical finish is achieved on face 1001 of mold base 1003. To achieve this finish, face 1001 of FIG. 10 is polished with a diamond compound polishing grit (such as DCIH manufactured by the D-M-E Corporation) having particles smaller than 3 microns to achieve a SPI-SPE #1 finish in accordance with the standards of the Society of Plastics Industry and the Society of Plastics Engineers. Subassembly 301 is formed in mold cavity 1012 against mold base 1003 by injecting a thermoplastic in a molten state into mold cavity 1012 via gate 1004 following well accepted molding practices. Advantageously, the resin can be Teflon ® FEP (perfluorinated ethylene propylene) for use with an optical medium of Shin-Etsu KE-103 two part silicone RTV (vinyl terminated dimethyl siloxane) or PVDF (polyvinylidine fluoride) for use with an optical medium of Conap CONOPTIC DPTU-10391 (flexible urethane elastomer). Pins 1007 through 1010 form alignment holes in subassembly 301. During the assembly of optical coupler 300, two of the resulting alignment holes are used with alignment posts 501 and 502 of FIG. 5 to align subassemblies 301 and 302. Pin 1002 forms fill hole 310 of FIG. 3.

Similarly, subassembly 302 is fabricated using mold 1100 of FIG. 11, which comprises mold cavity 1112 and mold base 1103. No thickness is illustrated for the wall of mold cavity 1112 but one skilled in the art could readily determine the thickness of that wall. Detail 1101 forms channel 309. In accordance with accepted molding practices, extrusion is slightly wider at the bottom to facilitate the removal of subassembly 302 from the mold. The face of detail 1101 is polished as previously described with respect to FIG. 10. Subassembly 302 is formed in mold cavity 1112 against mold base 1103 by injecting a thermoplastic in molten state into mold cavity 1112 via gate 1102 following well accepted molding practices. Alignment holes 1109 and 1110 in mold base 1103 form alignment posts 501 and 502 of FIG. 5. Grooves 1107 and 1108 form grooves in subassembly 302 similar to grooves 401 and 402 of FIG. 4. These grooves in subassembly 302 secure fasteners 304 and 305 of FIG. 3 during the assembly of optical coupler 300.

It is to be understood that the above-described embodiment is merely illustrative of the principles of the invention and other arrangements may be devised by those skilled in the art without departing from the spirit and scope of the invention. In particular, the optical coupler and core could readily be fabricated using different material types. Further, other shapes than the V-shape could be utilized for the channel of the optical coupler. Finally, other types of fasteners and alignment pegs and holes could readily be devised by one skilled in the art.

We claim:

1. An apparatus for optically coupling light between one optical fiber and a plurality of optical fibers, comprising:
    an optical core surrounded by a first and second subassemblies with said first and second subassemblies forming an optical cladding around said optical core;
    said first subassembly comprises an optically finished channel having a V-shaped lower portion perpendicular to the length of said optical fibers for achieving a predefined arrangement of said plurality of optical fibers and for aligning said optical fiber with said plurality of optical fibers.

2. The apparatus of claim 1 wherein said first and second subassemblies are molded and said optical core is a polymer material;
    said second subassembly comprises an optical finished surface for extending over a portion of said channel in which said optical core is formed; and
    said apparatus further comprises means for securing said first and second subassemblies together.

3. The apparatus of claim 2 wherein said first subassembly comprises strain relief means for securing said optical fiber and said plurality of optical fibers to said first subassembly.

4. The apparatus of claim 3 wherein said first subassembly further comprises alignment pins and said second subassembly comprises alignment holes matching said alignment pins thereby aligning said first and second subassemblies together.

5. The apparatus of claim 2 wherein said means for securing said first and second subassemblies comprises two fasteners for clipping onto said first and second subassemblies.

6. The apparatus of claim 5 wherein said first and second subassemblies further comprise grooves for attaching said fasteners.

7. The apparatus of claim 2 wherein said channel gradually reduces in size from the end into which said plurality of optical fibers is inserted from a size that accommodates said plurality of optical fibers with a buffer layer surrounding each of said plurality of optical fibers to a size that only accommodates said plurality of optical fibers with said buffer layer removed from each of said plurality of optical fibers.

8. A method for fabricating an optical coupler for optically coupling light between one optical fiber and a plurality of optical fibers, said method comprising the steps of:
    assembling first and second subassemblies together to form a cavity between said first and second subassemblies where said first subassembly has an optically finished channel having a V-shaped lower portion perpendicular to the length of said optical fibers for achieving a predefined arrangement of said plurality of optical fibers and for aligning said optical fiber with said plurality of optical fibers and said second subassembly has an optical finished surface for extending over a portion of said channel forming said cavity;
    inserting said plurality of optical fibers into said optical finished channel of said first subassembly;
    injecting an optical medium into said cavity; and
    inserting said optical fiber into said cavity.

9. The method of claim 8 wherein said first and second subassemblies are molded and said optical medium is a polymer material.

10. The method of claim 9 wherein said step of inserting said plurality of optical fibers comprises the step of strain relieving said plurality of optical fibers.

11. The method of claim 10 wherein said step of inserting said plurality of optical fibers further comprises the steps of placing an alignment tool into an end of said cavity opposite an end into which said plurality of optical fibers is inserted; and
    positioning said plurality of optical fibers up to said alignment tool whereby said plurality of optical fibers is proper positioned in said cavity.

12. The method of claim 9 wherein said step of assembling comprises the step of attaching fasteners to said first and second subassemblies.

* * * * *